(12) United States Patent  (10) Patent No.: US 6,598,336 B2
Link  (45) Date of Patent: *Jul. 29, 2003

(54) MODULAR DRESSING RETAINER ASSEMBLY

(75) Inventor: Donald J. Link, Shakopee, MN (US)

(73) Assignee: Skirt Plus, Inc., Savage, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/476,671

(22) Filed: Dec. 30, 1999

(65) Prior Publication Data

US 2002/0178644 A1 Dec. 5, 2002

(51) Int. Cl.⁷ ................................................ A01K 85/00
(52) U.S. Cl. .................... 43/42.28; 43/42.24; 43/42.37; 43/42.38
(58) Field of Search .............................. 43/42.24, 42.28, 43/42.19, 42.08, 42.05, 42.25, 42.37, 42.38

(56) References Cited

U.S. PATENT DOCUMENTS

| | | | | |
|---|---|---|---|---|
| 1,454,820 A | * | 5/1923 | Readle | 43/42.05 |
| 2,278,876 A | * | 4/1942 | Hart | 43/42.28 |
| 2,618,094 A | * | 11/1952 | Shindler | 43/42.24 |
| 3,169,336 A | * | 2/1965 | Pope | 43/42.28 |
| 4,163,337 A | * | 8/1979 | Kress | 43/42.25 |
| 4,640,041 A | | 2/1987 | Stanley | |
| 4,914,851 A | * | 4/1990 | Acker | 43/42.05 |
| 5,113,607 A | * | 5/1992 | Pate | 43/42.28 |
| 5,207,016 A | * | 5/1993 | Pate | 43/42.28 |
| 5,251,395 A | | 10/1993 | Wicklund | |
| 5,495,690 A | * | 3/1996 | Hunt | 43/42.25 |
| 5,517,782 A | | 5/1996 | Link et al. | |
| 5,709,047 A | | 1/1998 | Link | |
| 6,122,856 A | * | 9/2000 | Hnizdor | 43/42.25 |
| 6,199,312 B1 | * | 3/2001 | Link | 43/42.24 |
| 6,233,863 B1 | * | 5/2001 | Dotson | 43/42.28 |

* cited by examiner

Primary Examiner—Darren W. Ark
(74) Attorney, Agent, or Firm—Altera Law Group LLC (57) ABSTRACT

A molded retainer system for fishing lure dressings and accessories. In an integral retainer construction, a headpiece and stem piece are separated by a recess space along the stem piece that supports desired dressings, for example, banded or roll-up multi-stranded skirts, scent collars and/or rattles. The headpiece can include fringed edges, filaments with interconnected rattles or bristled weedguards. In a two-piece construction, a detachable stem piece is shaped to plug mount to a cavity at the headpiece. A variety of different lure dressings can be fitted to the stem-piece prior to being re-mounted to the headpiece. A multi-stranded skirt having a series of protrusions at each strand is also disclosed that can be fitted to the retainers.

15 Claims, 13 Drawing Sheets

MODULAR DRESSING RETAINER ASSEMBLY

BACKGROUND OF THE INVENTION

The present invention relates to fishing lures and, in particular, to a modular lure dressing system wherein a molded head and trailing stem piece either include or support attachments having fringed edges, filaments, elastomer skirts, rattles, open-celled scent pods, weed guards and/or other lure accessories.

A dressing commonly mounted to fishing lures, such as jigs, "spinner baits" or "buzz baits", is a multi-stranded skirt. The skirts are typically fabricated from flat sheets of an elastomer material, such as natural rubber or silicone rubber. Each sheet is processed into a number of regions that define individual skirts and each skirt is defined by a multiplicity of slits or strands that are attached to solid borders that bound the ends of the strands. The slits can be cut to different two-dimensional patterns. The skirts are cut from the sheets with the borders attached and the strands are contained by the borders, until the strands are collected and bound together, when the borders are but from the skirts.

Rubber bands or adhesively bound elastomer collars are frequently used to secure the strands together. After banding, the borders are cut from the strands and the skirt is ready to be mounted to a desired lure. Examples of banded skirts can be found at U.S. Pat. Nos. 4,640,041 and 5,251,395. Examples of "rollup" skirts or skirts with elastomer collars are shown at U.S. Pat. Nos. 5,517,782 and 5,709,047.

Rollup skirts are formed by rolling and bonding the border of a skirt to a tubular, elastomer core or collar piece with an appropriate adhesive. Once bonded, the border is cutaway and the cut ends of the strands trail from the core piece. The core piece and wrapped skirt stretch when the skirt is mounted to a lure.

Most lures that are accessorized with a skirt include a bulbous, molded head or body. Spinner baits include a formed wire that protrudes from the molded head and typically support one or more metal blades that spin and vibrate as the lure is retrieved. A fishing line is attached to the wire or an eye of a hook that protrudes from the head or body of the lure. As the lure is retrieved, the strands of the skirt undulate with movement of the lure through water to entice a prey species of fish to strike.

Trailer dressings can be added to a lure containing hooks to increase the bulk of the presented offering. A trailer can also be added to customize a desired color scheme at the lure. A trailer dressing may also define the lure, such as with salt water lures which typically include a hook assembly that is threaded through a trailing dressing.

Many lures are constructed with trailer dressings that include natural hair, such as rabbit, deer or squirrel tails mounted to a hook. The strands of hair are secured to the hook with shaped wrappings of a colored thread material that defines a bulbous head.

Various patents that disclose components that may be used with the head and stem pieces of the subject system are U.S. Pat. No. 5,517,782 which discloses a rattle band system. U.S. Pat. No. 5,709,047 discloses multi-stranded skirts with end protrusions. U.S. patent discloses multi-stranded roll-up skirts mounted to a center core piece.

The modular dressing system of the present invention provides lure designers with still other modular lure components that can be used alone or in combination with other components to define a number of alternative, lure dressings. The dressings can, for example, replace natural hair dressings. Several constructions of trailer dressings of the latter type are disclosed that particularly provide a bulbous headpiece and from which a stem piece trails that supports other dressing accessories along a recessed shank. A longitudinal bore extends through the head and stem pieces. The headpiece can be molded to include cut or fringed edges, filamentary members, bored flanges, bristled weed guards, rattles, scent pods etc. The stem piece can be made to plug mount to a mating cavity at the headpiece.

SUMMARY OF THE INVENTION

It is accordingly a primary object of the invention to provide a modular system of lure dressing components that can be fitted to or used to define a variety of alternative fishing lures.

It is a further object of the invention to provide a molded headpiece that can be molded from rubber, acrylic or other materials and from which a stem piece trails that supports multi-stranded skirt dressings.

It is a further object of the invention to provide a headpiece that can variously include fringed edges, filamentary rattles, bristled weed guards, a concave recess to shelter attached accessories, a hollow rattle chamber, fixed or movable ornamental eyes, etc.

It is a further object of the invention to provide a stem piece that plug mounts to a mating cavity at the headpiece.

It is a further object of the invention to provide salt water lure components that support a hook harness and have a relatively large molded headpiece that can include rattle beads within a hollow chamber, fixed or movable ornamental eyes, and/or flecked decorative members and which headpiece detachably interconnects with a trailing stempiece that separately supports one or more multi-stranded skirts, rattles, or other accessories.

It is a further object of the invention to provide a silicone rubber skirt dressing that includes molded protrusions that project from the strands at tailored intervals.

The foregoing and other objects, advantages and distinctions of the invention are obtained in a number of presently preferred, lure dressings that are compatible with several interchangeable components. In one series of dressings, integrally molded head and stem pieces are provided that include an annular recess along the shank of the stem that is set forward of a flanged tail piece and that supports other dressings, for example, a banded or roll-up multi-stranded skirt and/or a collar from which filaments and rattles trail and/or a scent pod. The headpiece can include fringed edges, filaments with interconnected rattles or bristled weed guards.

In another series of dressings, a detachable stem piece is shaped to plug mount to a cavity at the headpiece. A variety of different dressing components can be fitted to the shape of the stem piece prior to being mounted to the headpiece.

A novel multi-stranded skirt having a number of tailored protrusions at each strand is also disclosed. The protrusions can be molded to project transverse or orthogonal to the strands. The shape and height of the protrusions can also be tailored.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
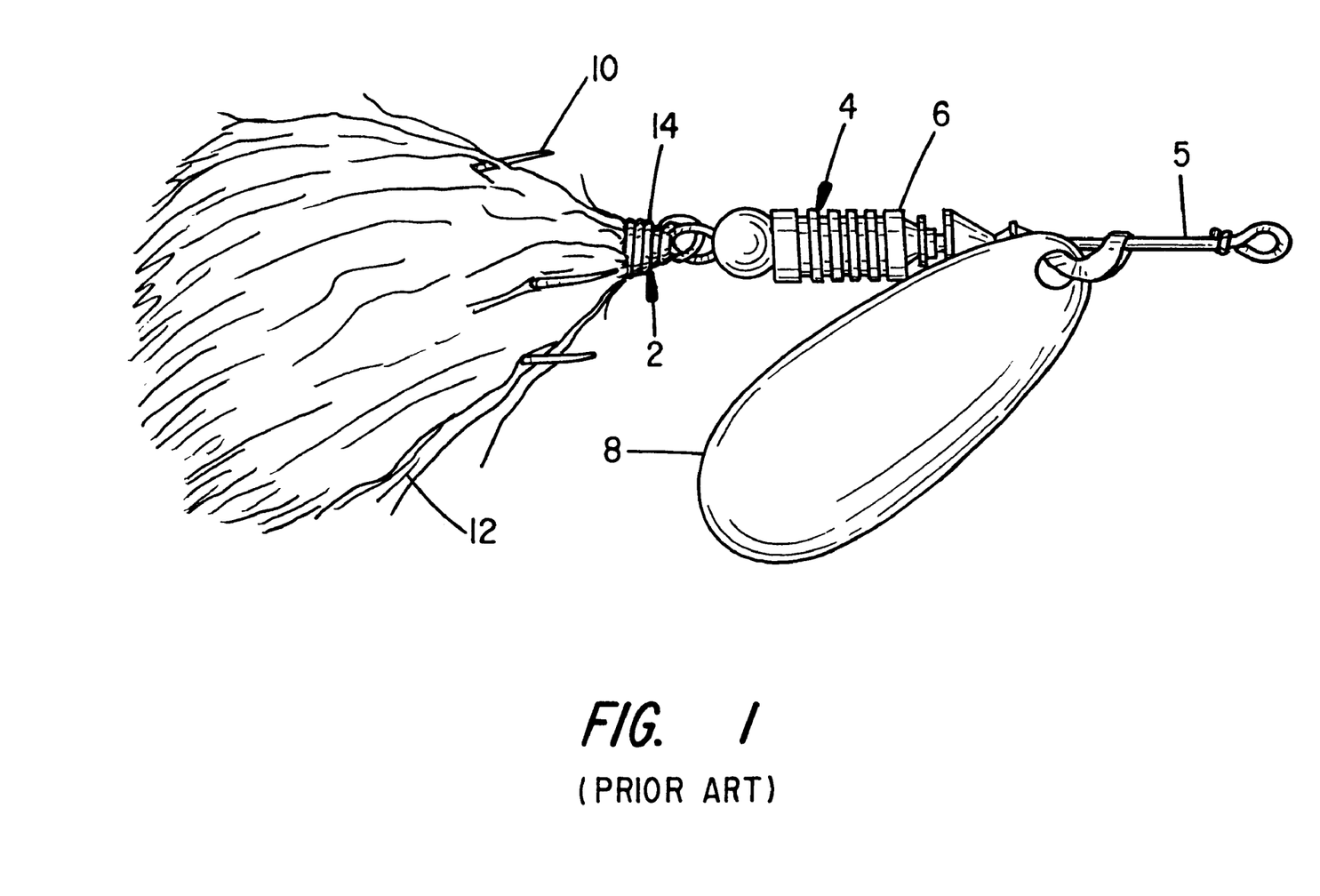
FIG. 1 is a perspective view to a prior art, in-line spinner bait having a treble hook and wrapped bucktail.

Referring to FIG. 1, a prior art, hand-wrapped trailer dressing 2 is shown, e.g. a buck tail trailer dressing, as is appears when attached to a typical in-line spinner bait lure 4. Spinner baits 4 of various constructions have long been used for trout, musky, northerns and other sport fish species. The construction of the body 6 and supporting wire form 5 can take many forms and the lure 4 can support one or more of a variety of spinner blades 8 of myriad sizes and shapes. The lure construction 4 shown at FIG. 1 represents one traditional lure configuration. The wrapped dressing 2 might also be mounted as a trailer hook to a spoon-type lure (not shown). In certain applications, the dressing 2 can be used alone or be fitted to a molded headpiece.

In its simplest form, the trailer dressing 2 provides a treble hook 10 that is hidden within a clump of dyed feathers or natural hair 12, for example, rabbit hair or deer tail or squirrel tail. A length of colored thread 14 is wrapped around an end of the hair 12 to secure the hair 12 to the hook 10. The wrappings 14 are typically glued and/or painted to enhance durability. That is, the life of the lure 4 is typically limited by the durability of the dressing 2. Over time the thread at the wrappings 14 can abrade and discolor.

Another deficiency of the dressing 2 is that the wrappings 14 are typically wrapped by hand, which adds to the cost of a lure 4. The properties of the hair and/or feathers 12 also limit the range of color presentations that can be offered.

Figure 2:
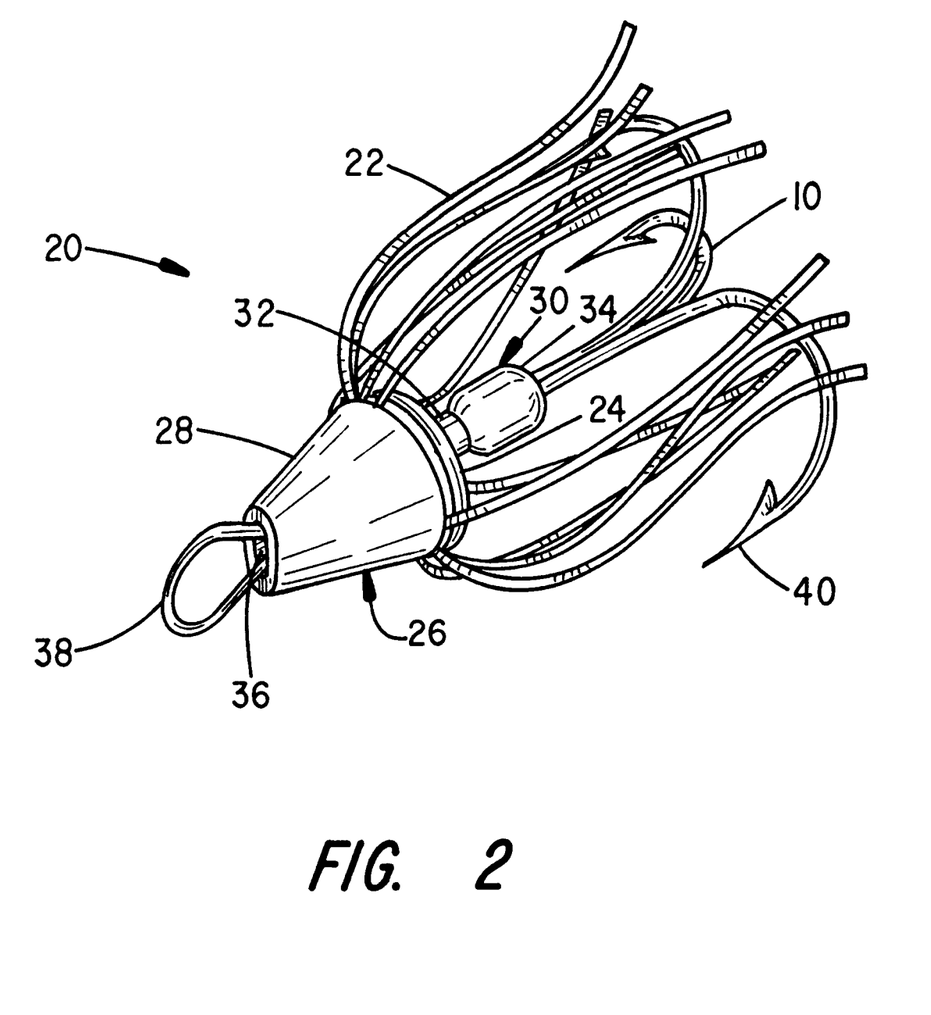
FIG. 2 is a perspective view to a treble hook finished with a molded rubber head and stem piece of the invention and a wrapped silicone rubber skirt is fitted to the stem piece.

In lieu of using natural materials, the dressing 20 shown at FIG. 2 provides a multi-strand, silicone rubber skirt 22 that is secured with a band 24 to the body of a molded retainer 26. The color scheme and surface treatment of the skirt 22 is established in relation to the desired aesthetics of the lure 4. The band 24 is typically formed from an elastomer material, although could be constructed from other materials, including plastics or polymers. The band 24 is elastic so that it can expand and contract to secure the skirt 22 to the contours of the retainer 26.

The retainer 26 provides a tapered headpiece 28 and a trailing stem piece 30. The skirt 22 is secured to an annular recess 32 along the stem piece 30 and forward of a bulbous tailpiece 34. The tailpiece 34 prevents the band 24 from slipping from the body 26 and can exhibit a variety of alternative shapes. The band 24 and a portion of the skirt 22 are typically pushed into a concave recess or cavity space 35 in the headpiece 28, reference FIG. 3.

Figure 3:
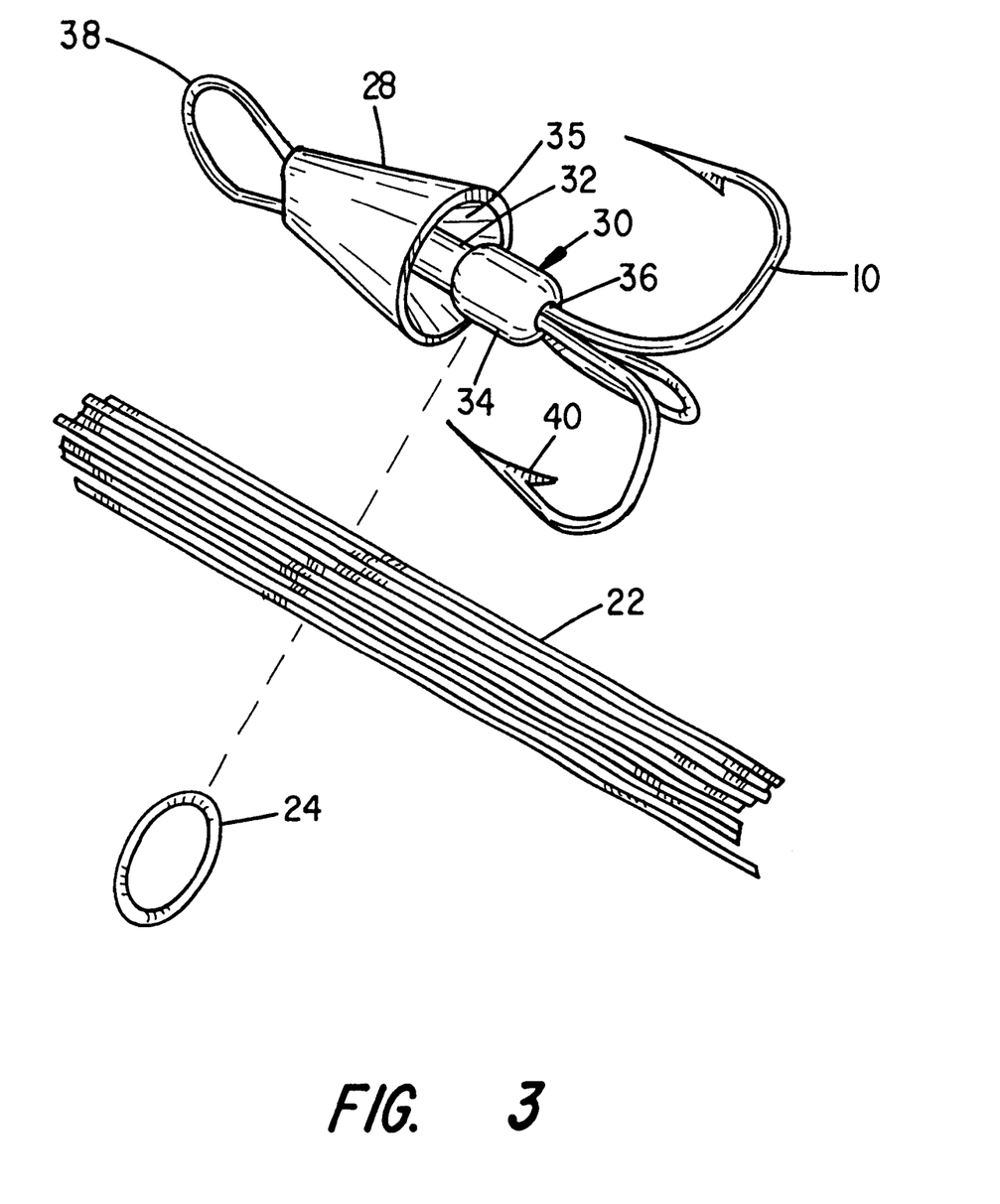
FIG. 3 is an exploded assembly view to the lure of FIG. 2.

The cavity space 35 extends into the headpiece 28 a depth sufficient to shelter the band 24 and forward portions of a skirt or any other attached accessories. A flat surface can alternatively be provided, if a cavity 35 is not required, reference the head piece 130 of FIG. 11.

The retainer 26 is preferably molded from a colored elastomer material, such as natural, latex or silicone rubber, although could be constructed of a plastic or acrylic material among other materials. The color selection of the retainer 26 and skirt 22 is only limited by the materials and which materials can be seeded with dyes, glitter granules and/or coated with paints, and metal laminates, among other enhancements.

The headpiece 28 exhibits a conical taper. It, however, can be molded to any of a variety of elongated geometric or oblong shapes of irregular or regular form (e.g. spherical, ovular, cylindrical). A bore 36 extends the entire longitudinal length of the retainer 26. The retainer 26 can thereby be fitted onto any desired hook by merely threading the retainer 26 over the hook eye 38 of a treble hook 10 or the barb 40 of a single barb hook (not shown).

Figure 4:
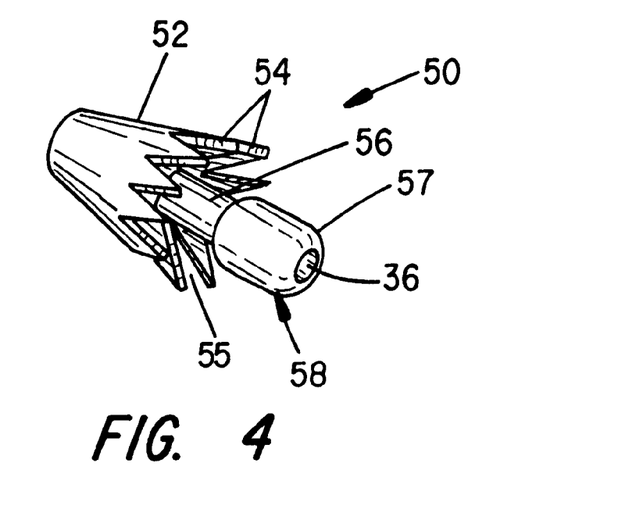
FIG. 4 is a perspective view to a molded head and trailing stem piece having a tapered fringe that radiates from a peripheral edge of the headpiece.
Figure 5:
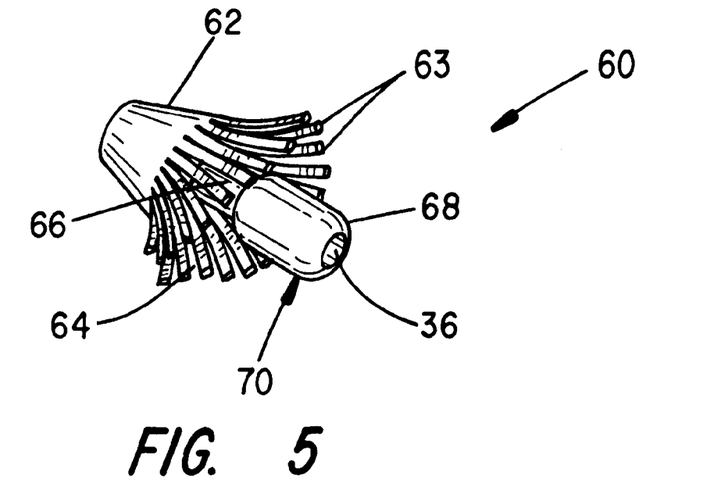
FIG. 5 is a perspective view to a molded head and trailing stem piece having a straight cut fringe that radiates from a peripheral edge of the headpiece.

With attention to FIGS. 4 and 5, alternative retainers 50 and 60 are shown. The headpieces 52 and 62 of the retainers exhibit different shapes, although the stem piece of each is essentially the same as the body 26. The headpiece 52 provides a tapered fringe 54 that extends from a peripheral edge of the head and overlies a cavity space 55 and the recessed shank 56 and tailpiece 57 of a stem piece 58. A longitudinal bore 36 extends through the headpiece 52 and stem piece 58. The fringe 54 can be formed to a variety of shapes, extend any desired length and can be colored to accentuate any skirt 22 fitted to the headpiece 52.

The retainer 60 provides a headpiece 62 that contains a slit fringe 63. Numerous filaments 63 extend over a recessed cavity space 64 in the headpiece 62. A recess 66 is provided at the shank to support a skirt (not shown) forward of a tailpiece 68 that protrudes from the aft end of the stem piece 70. The length and color of the filaments 63 can be varied as desired relative to any attached skirt. The exposed surfaces or peripheral edges of the retainers 50 and 60 can be formed to provide any variety of filaments of still other shapes, spacings, lengths and/or can include apertures or notches to accommodate other structures fitted into the cavity spaces 55 or 64.

Figure 6:
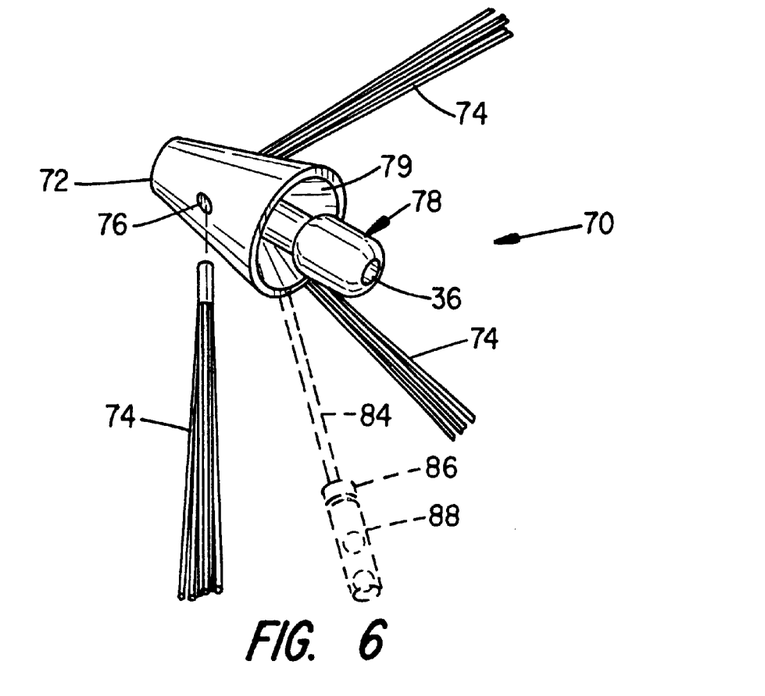
FIG. 6 is a perspective view to a molded head and trailing stem piece having a number of bristle weed guards.
Figure 7:
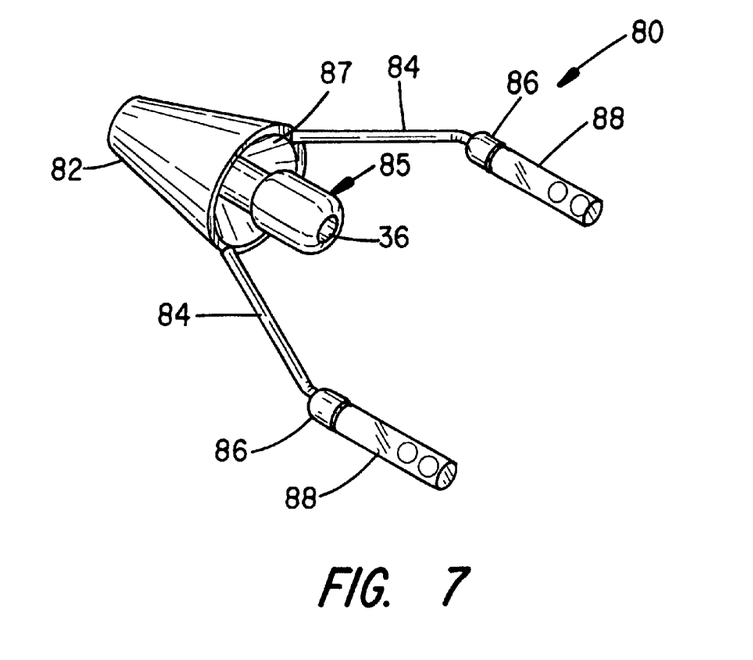
FIG. 7 is a perspective view to a molded head and trailing stem piece having a number of filamentary rattle holders depending from the peripheral edge of the headpiece.
Figure 8:
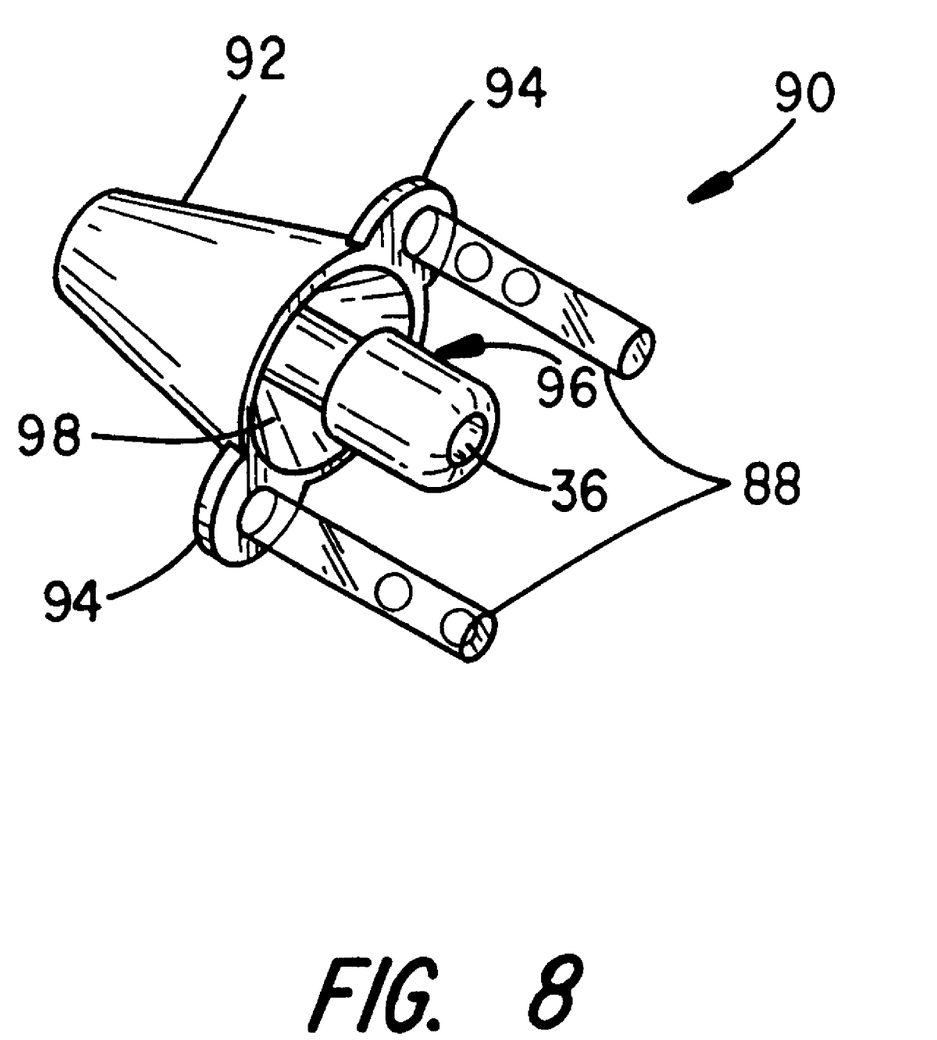
FIG. 8 is a perspective view to a molded head and trailing stem piece having a number of bored tabs that radiate from a peripheral surface of the headpiece and that contain trailing rattles.

FIGS. 6 through 8 depict retainers 70, 80 and 90 that support other lure dressing accessories from headpieces 72, 82 and 92. The retainer 70 includes a number of multi-bristled weed guards 74 that are bonded to apertures 76 at the headpiece 72. A stem piece 78 extends from a recessed space 79 of the headpiece 72.

The retainer 80 includes a pair of filaments 84 that extend to end caps 86 and support flanged ends (not shown) of individual rattles 88 mounted in cavities of the end caps 86. A stem piece 85 extends from a recessed space 87 of the headpiece 72.

The retainer 90 provides a headpiece 92. A pair of bored tabs 94 radially project from a peripheral edge of the headpiece 92. Flanged heads of a number of rattles 88 are fitted into the bores of the tabs 94. A stem piece 96 also extends from a recessed cavity space 98 of the headpiece 92.

It is to be appreciated the retainers 26, 50, 60, 70, 80 and/or 90 can be molded to support any of the foregoing accessories at other surface locations or still other dressing accessories in any desired arrangement or combination. For example, one or more filaments 84 and rattles 88 might be fitted to a retainer that includes weed guards 74, reference the dashed line portion of FIG. 6. See also the optional dashed line accessories at FIG. 10.

Figure 9:
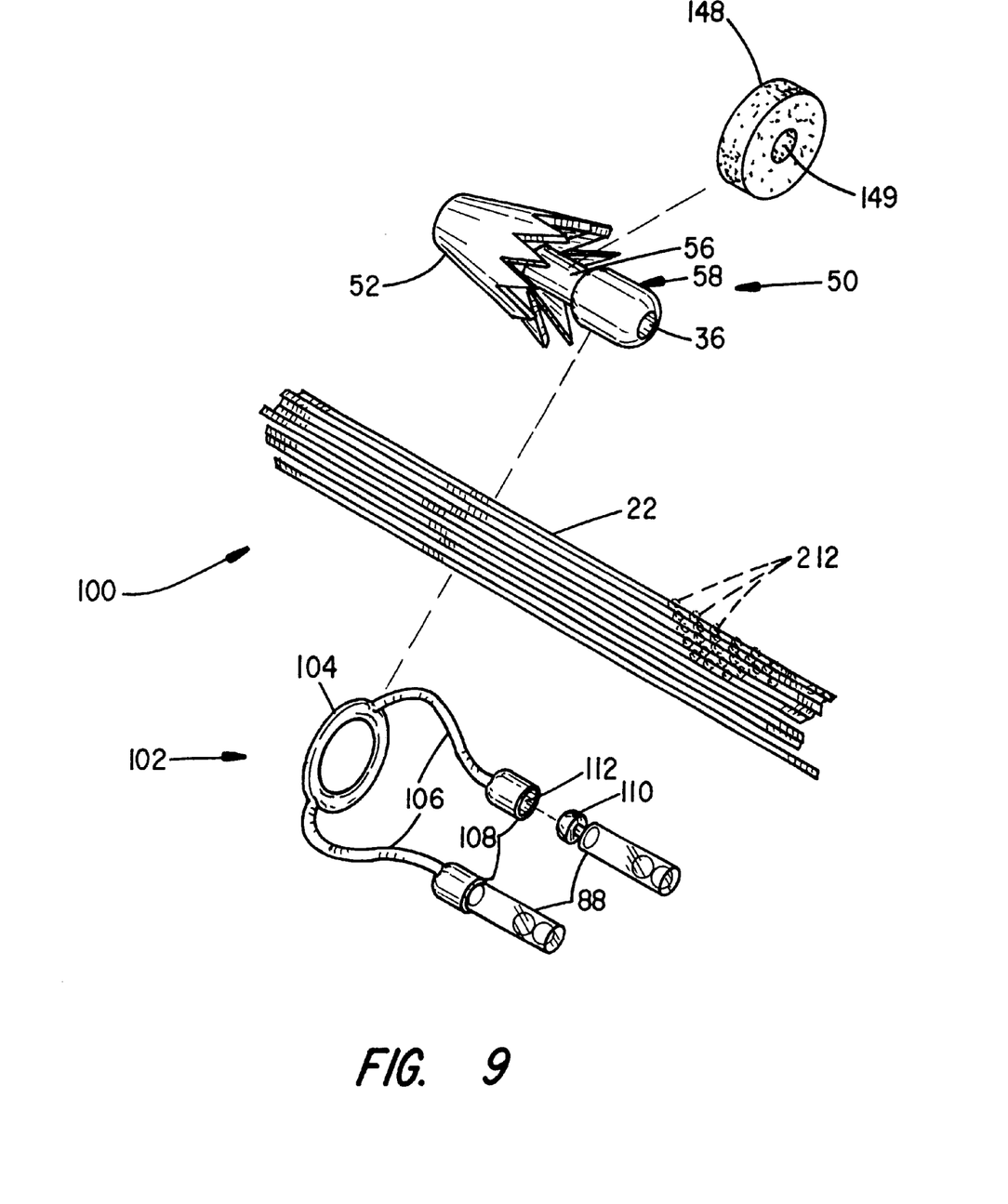
FIG. 9 is an exploded assembly view to a lure having a molded head and trailing stem piece that supports filamentary rattles and a multi-stranded skirt containing molded protrusions.

FIG. 9 depicts yet another exemplary retainer assembly 100 wherein the retainer 50 supports a skirt 22 to the recessed shank 56 of the stem piece 58 with a filamentary rattle assembly 102. The rattle assembly 102 includes a molded rubber collar 104 and from which a pair of filaments 106 extend to cupped ends 108. A flanged head 110 of each of a pair of rattles 88 is supported to a cavity 112 at the ends 108. The collar 104 binds the skirt to the shank 56.

Figure 10:
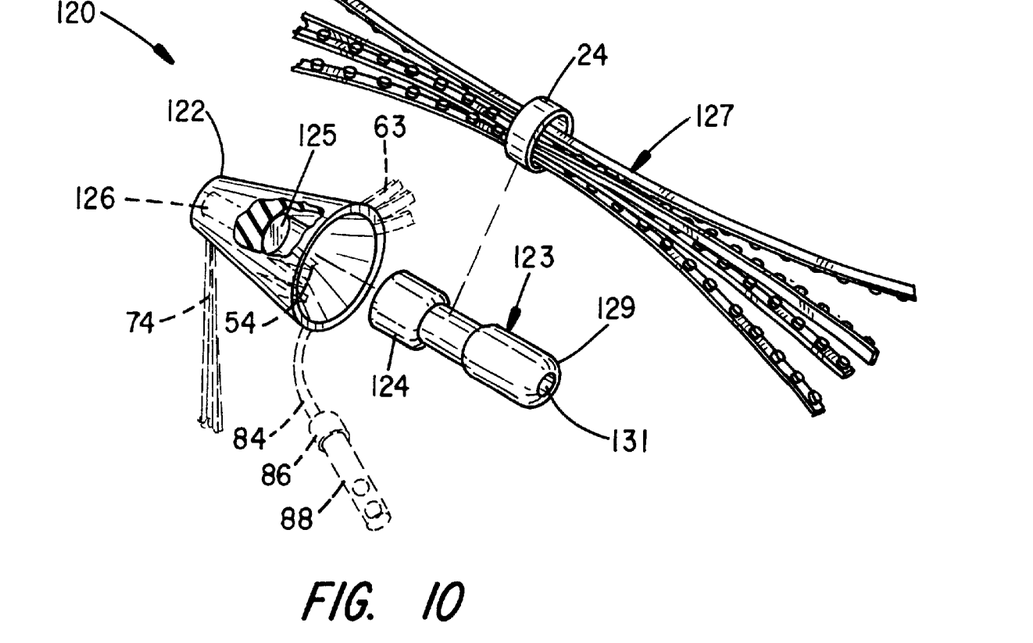
FIG. 10 is a perspective view to a molded head having a detachable stem piece that plug-mounts to the head piece and supports accessory dressings such as a banded skirt.
Figure 11:
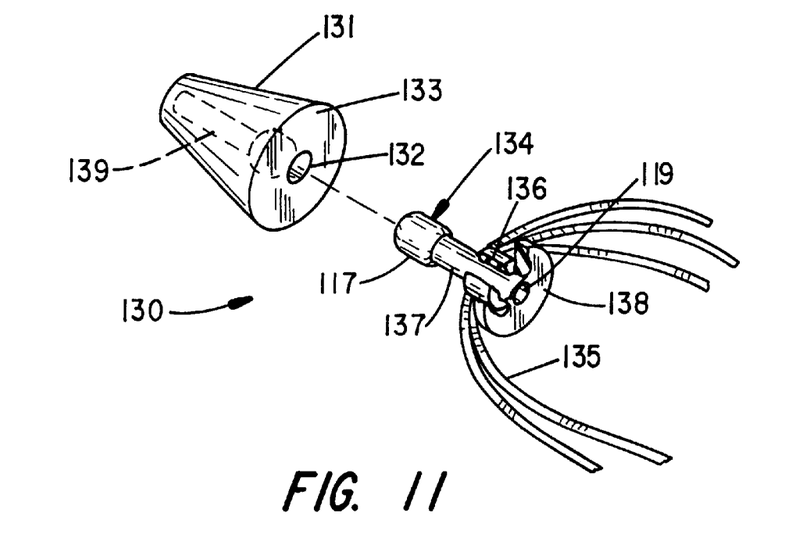
FIG. 11 is a perspective view to a molded head having a detachable stem piece with a roll-up skirt fitted thereto.
Figure 12:
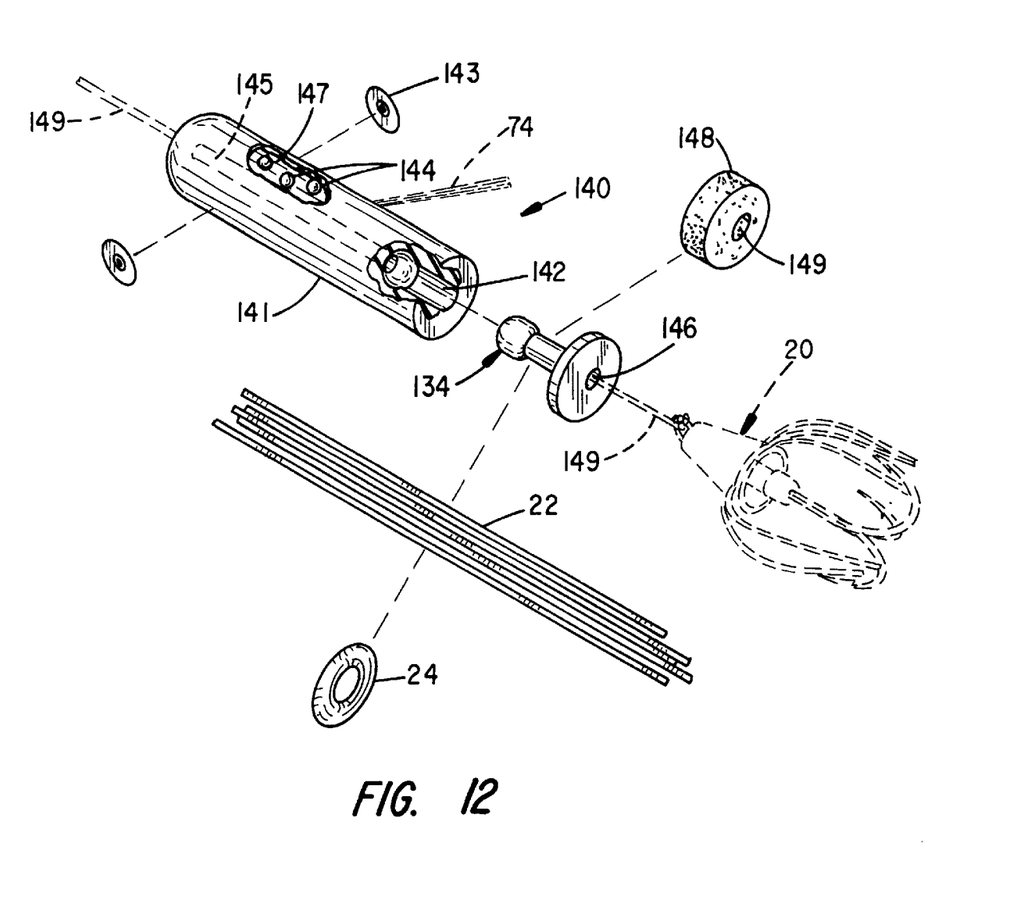
FIG. 12 is a perspective view shown in exploded assembly to an over-sized molded acrylic head and an interconnecting plug-mounted accessory stem piece that supports a multi-filament skirt and skirt band.

Appreciating the physical bulk of some of the accessories that can be fitted to the body of the subject retainers and the difficulty of mounting the accessories to the retainer, a number of multi-section retainer bodies 120, 130 and 140 are depicted at FIGS. 10 through 12. The retainers 120, 130 and 140 each provide detachable stem pieces that plug mount or interconnect to a mating cavity at the headpiece. Desired accessories can thereby be mounted to the stem piece, prior to the stem piece to the headpiece. Although plug mounted stem pieces are shown, the head and stem pieces can be constructed to accommodate twist-lock type attachments.

Figure 15:
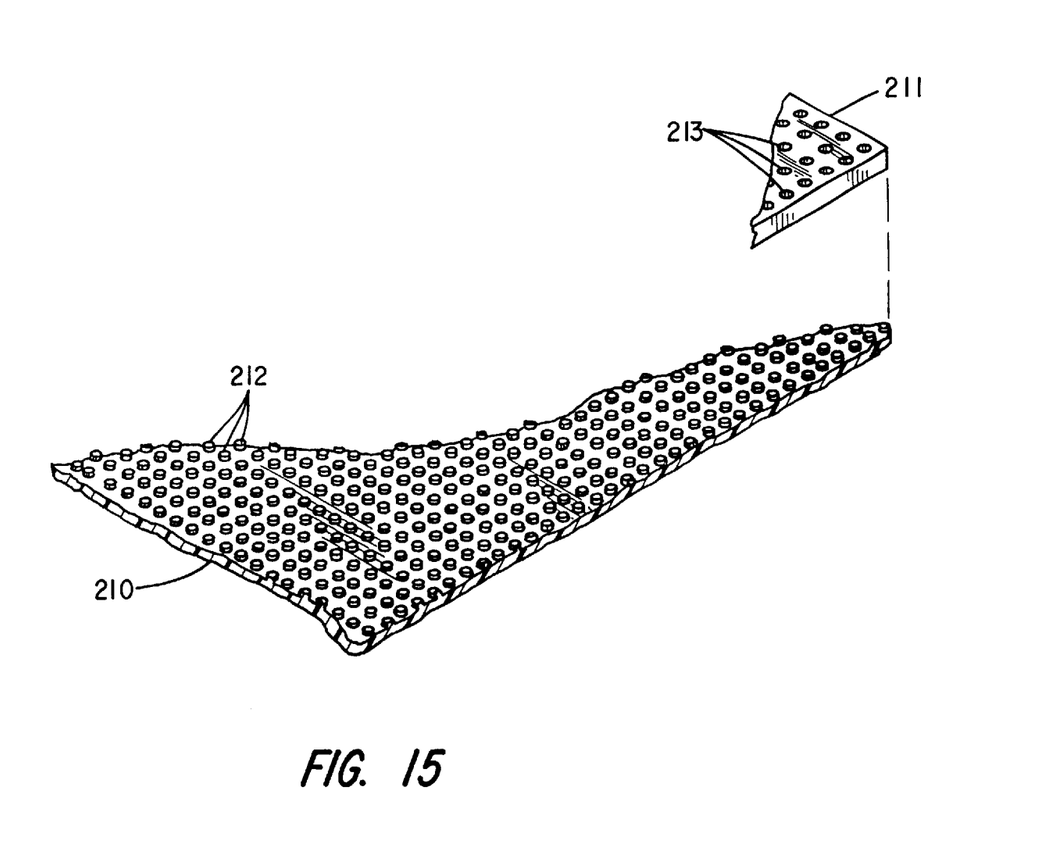
FIG. 15 is a perspective view to a section of a skirt material having shaped protrusions.
Figure 16:
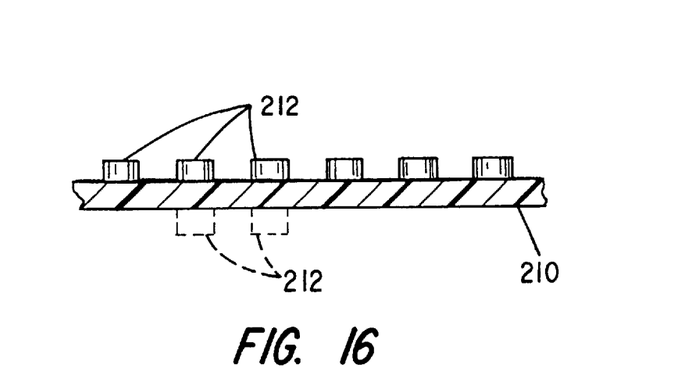
FIG. 16 is a cross section view to the skirt material of FIG. 15.
Figure 17:
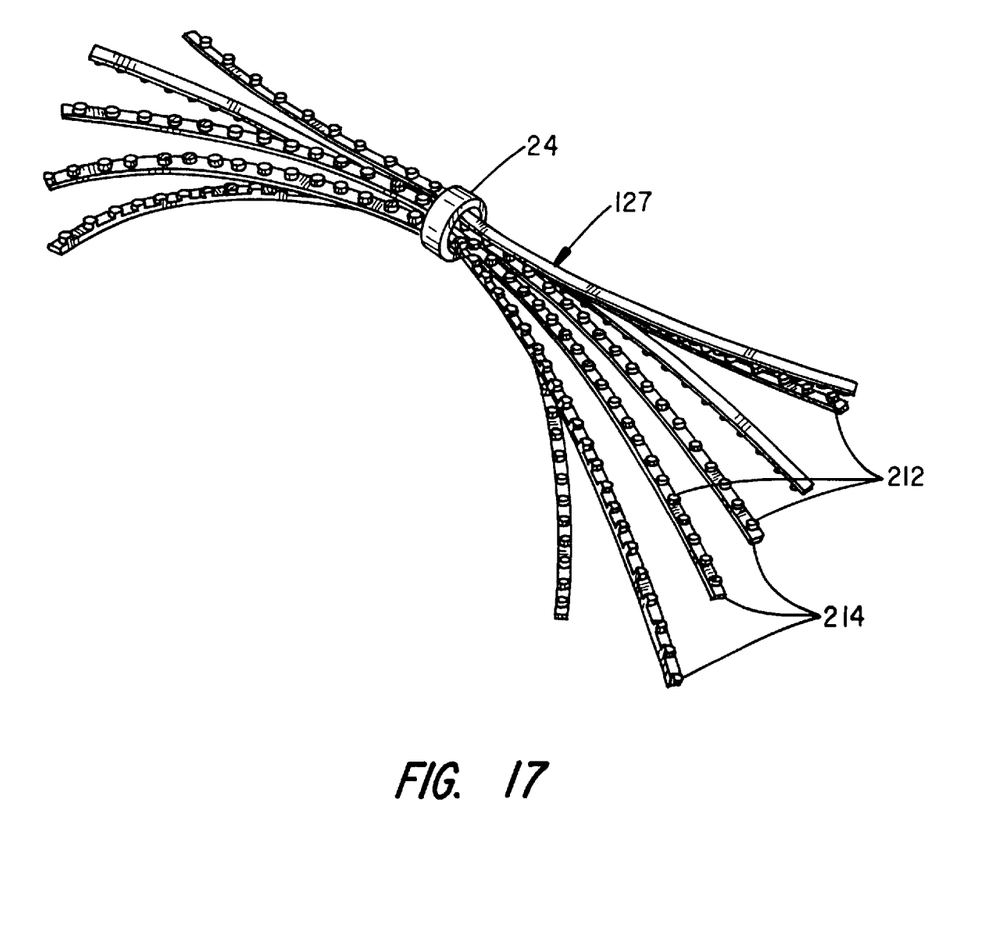
FIG. 17 is a perspective view to a banded skirt having shaped protrusions at the filaments and which can be fitted to the foregoing molded head and stem pieces.

For example, the retainer 120 of FIG. 10 provides a headpiece 122 and a detachable stem piece 123. A bulbous head 124 of the stem piece 123 mounts in a mating cavity 125 that extends coaxial with a bore 126 (shown in dashed line) through the headpiece 122. Desired accessories, such as a novel skirt 127 that is described below with respect to FIGS. 15–17, are secured to a recess along the shank 128 and forward of a bulbous tailpiece 129 at the end of the stem piece 123. A bore 131 that aligns to the bore 126 extends through the stem piece 123. Some of the many other features that can be included at the headpiece 122, such as tapered fringe 54, slit fringe 63, filamentary rattles 84,86,88 and/or weed guard 74, are shown in dashed line.

FIG. 11 depicts the retainer 130 and which provides a headpiece 131 having a bore 132 that extends through a flat end surface 133. A bulbous forward end 117 of a stem piece 134 interlocks with the cavity 132. A skirt 135 (i.e. a roll-up skirt that is adhesively bonded to a separate core 1360 is mounted to a recess along the shank 137 and forward of a disk-like flanged tailpiece 138 at the end of the stem piece 134. In lieu of mounting the skirt to a separate core 136, the skirt 135 might be wrapped and adhesively bonded directly to the shank 137 of the stem piece 134 and/or secured with a rubber band in conventional fashion. Bores 139 and 119 respectively extend through the headpiece 131 and stem piece 134.

FIG. 12 depicts the retainer 140, which includes a molded headpiece 141. A shaped cavity 142 formed into the headpiece 141 accepts a stem piece 134. The headpiece 141 is constructed to a substantial size and weight, and can be used with salt or fresh water lures with a separately attached trailer hook, hook harness or dressing 20. The headpiece 141 can be molded from a variety of materials including acrylics, plastics, metal or rubber. The headpiece 141 can include ornamental eyes 143, rattle beads 144 that move in a hollow internal chamber 147, weed guards 74, filamentary rattles 84–88 or 104–108 etc. The headpiece 141 can also be ornamented with a variety of other decorative materials mounted either internally or along the exterior surfaces.

A skirt 22 of appropriate size is secured to the stem piece 134 with a band 24. The skirt 22 or skirt 127 may alternatively be secured to the stem piece 134 with a band or as part of a roll-up skirt that is mounted to a core 136. Bores 145 and 146 extend through the headpiece 141 and stem piece 134 and through which a fishing line 149 is typically threaded. A single hook, hook harness 174 or trailer dressing 20 can be separately attached to the fishing line.

Also shown at FIGS. 9 and 12 is an annular cloth or open-cell sponge piece or scent carrier 148 that can be mounted to the stem piece 134 at a bore 151. Various liquid scents can be absorbed into the sponge 148. The color and density of the sponge 148 can be adjusted as desired in conventional fashion. Advantageously, however, the sponge 148 provides a scent carrier that can be combined with the visual and audible accessories that can be fitted to the headpiece 141 or stem piece 134. The scent is released over time from the carrier 148.

Figure 13:
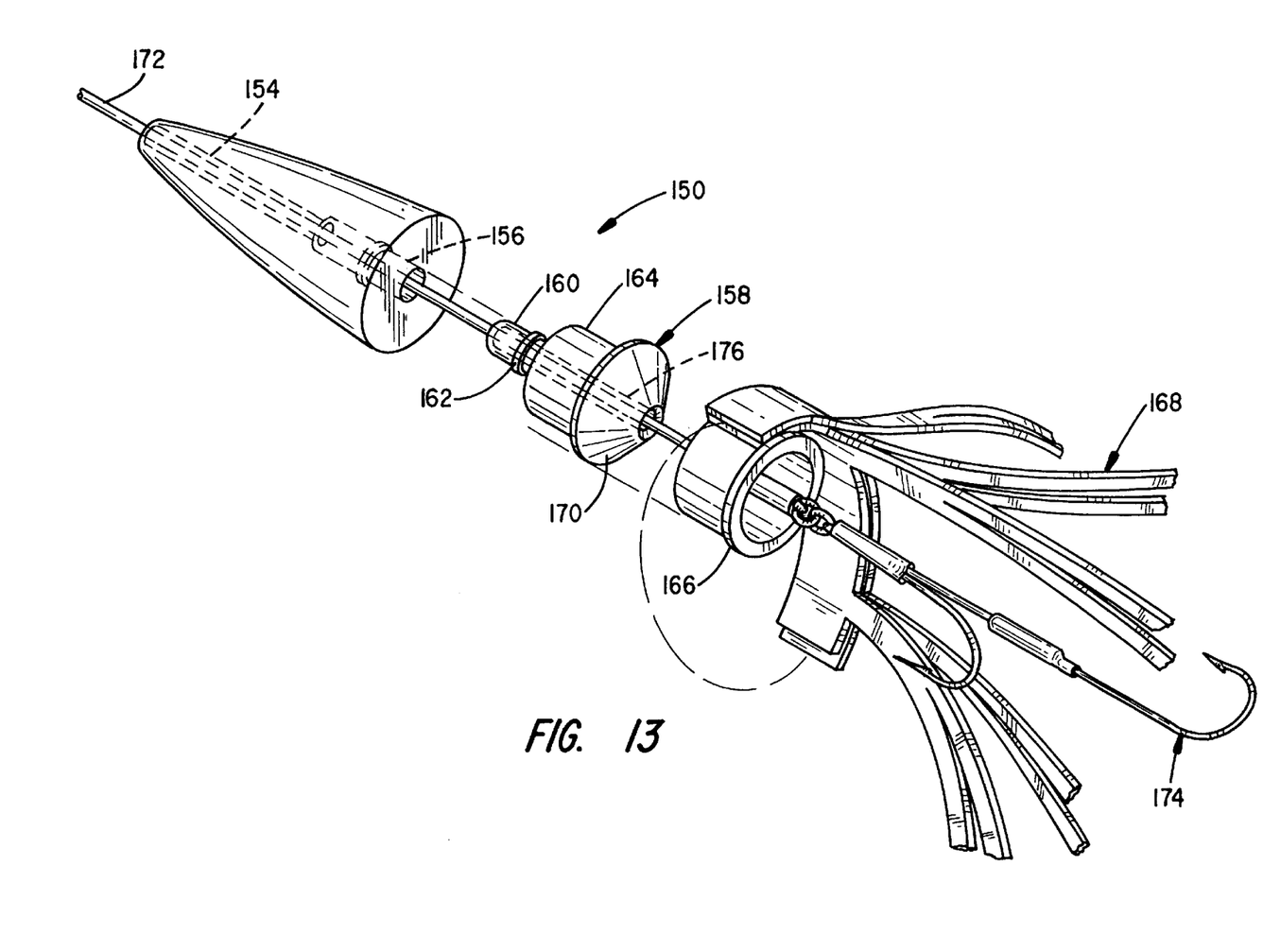
FIG. 13 is a perspective view to a salt water lure of the invention shown in exploded assembly and wherein a molded head is fitted with a detachable stem piece that supports a roll-up skirt.

FIG. 13 shows still another salt water lure 150 that is constructed with the various features of the invention in mind. The lure 150 provides a conical shaped acrylic head 152. A bore 154 extends through the head 152 to a cavity 156 that mates with a stem piece 158. The stem piece 158 can be constructed of any variety of materials, e.g. rubber, plastic, metal etc.

An interlocking or latch end 160 of the stem piece 158 includes an annular flange 162 that mates with the cavity 156. A larger diameter surface 164 abuts the aft end of the headpiece 152 and supports the core 166 of a rollup skirt 168. A tailpiece 170 retains the core 166 to the stem piece 158. A supporting stranded wire snell 172 of a hook harness 174 is threaded through the bore 154 and cavity 156 of the headpiece 152 and bore 176 of the stem piece 158.

Figure 14:
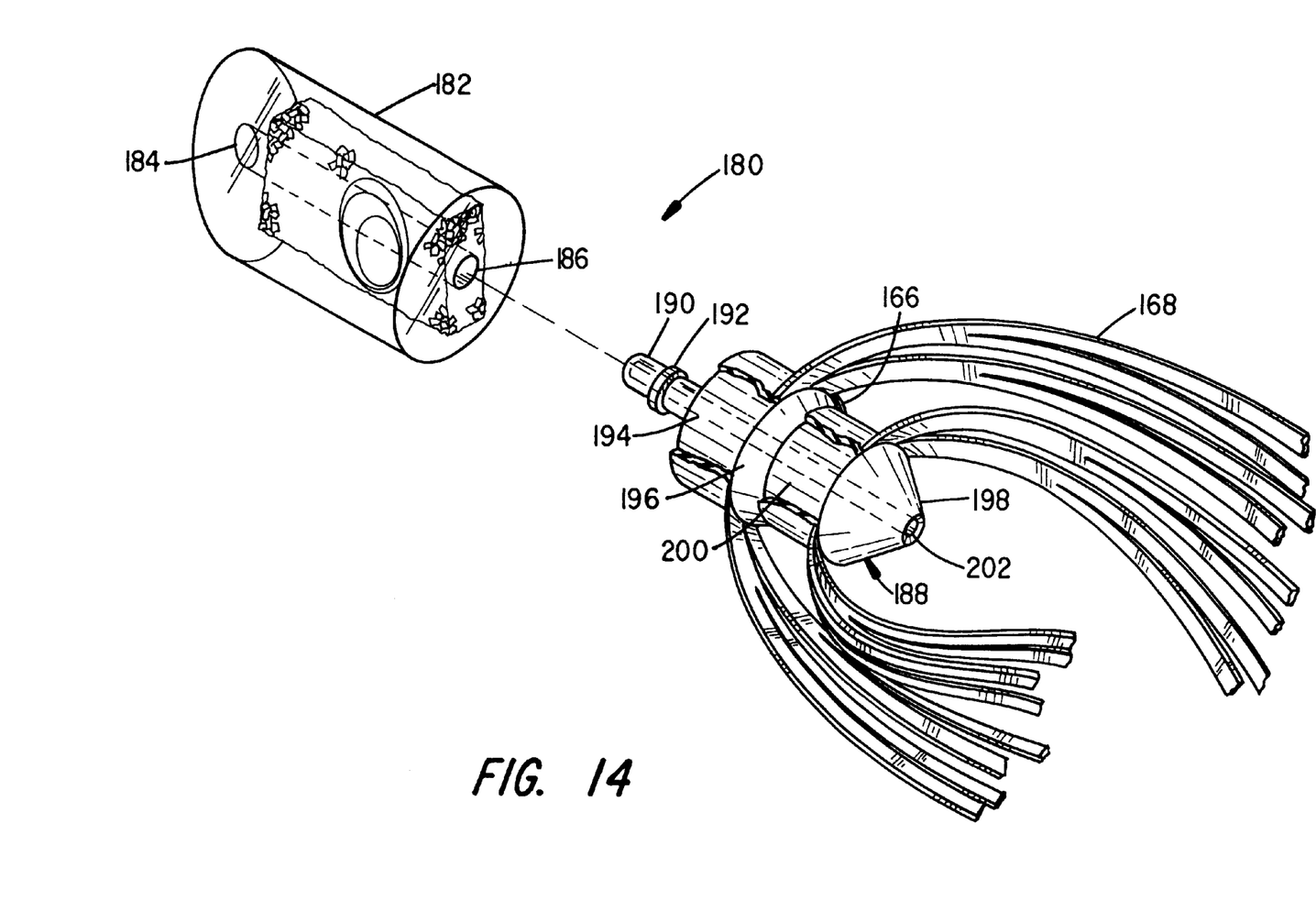
FIG. 14 is a perspective view to an alternative salt water lure wherein the head is fitted with a detachable double flanged stem piece and skirts are fitted to the two flanges.

FIG. 14 shows still another so called "Hawaiian" type salt water lure 180. The lure 180 provides a cylindrical shaped acrylic head 182 having flat forward and aft surfaces. A bore 184 extends through the head 182 to a cavity 186 that mates with a stem piece 188. A latching end 190 of the stem piece 188 includes an annular flange 192 that mates with the cavity 186. An adjacent, larger diameter surface 194 mounts to abut the aft end of the headpiece 182 and supports the core 166 of a rollup skirt 168. Tapered flanges 196 and 198 are offset from a second skirt support surface 200. A second skirt 168 of an appropriate color, size and shape is typically fitted to the surface 200. A supporting snelled hook harness, not shown, is typically threaded through the bore 184 and cavity 186 of the headpiece 182 and bore 202 of the stem piece 188.

With attention to FIGS. 15 through 17, views are shown to the earlier mentioned novel skirt 127 that can be used with any of the foregoing lure constructions. The skirt 127 is formed from a flat silicone rubber pre-form or partially cured layer of rubber 210. The pre-form 210 is shaped by pressing a perforated grate, screen or other mold 211 into one or both exposed surfaces of the pliable pre-form 210. A number of raised projections 212 are thereby created at each of the mold's aperture 213. Protrusions can be created in each of the pre-form's top and bottom surfaces upon pressing each with a suitable mold. The protrusions 212 are typically defined in uniform patterns of desired rows and/or columns.

Upon curing the pre-form 210, the cured rubber sheet 210 is slit into a number of regions containing a plurality of strands bound at their ends with a border piece. Each strand includes a desired series or arrangement of protrusions 212. Upon dicing the sheet into a number of skirts, each skirt is bound with a band 24 or bound to a collar piece 136 or bound to the shank of a stem piece and the border is cutaway. Upon mounting the skirt to a lure or stem piece, the protrusions 212, exaggerate the undulation of the strands 214 and cause bubbles to form when drawn through the water. A more enticing presentation is thereby presented to a particular fish species being sought.

Although the invention is described with respect to a number of presently considered fishing lure dressings, the features at the dressings can be applied singularly or combined in different arrangements. The following claims should therefore be interpreted broadly to include all equivalent constructions within the scope of the wording.

What is claimed is:

1. A fishing lure dressing, comprising;
   a continuously tapered headpiece, the headpiece having a first narrow end, a second wider end, a cavity at the wider end, and a stem piece being attached to and extending from the narrow end of the headpiece, the stem piece including a narrow stem portion disposed within the cavity and a bulbous tailpiece disposed outside the cavity, the narrow stem portion having an outer diameter substantially smaller than an inner diameter of the cavity so that a space is defined between an interior wall of the cavity and the narrow stem portion of the stem piece;
   the stem piece having a bore extending through the bulbous tailpiece, the narrow stem portion and exiting the first narrow end of the headpiece, the bore retaining a shaft of a hook such that an eye of the hook extends exteriorly from the first narrow end of the headpiece and at least one barb of the hook extends exteriorly from the bulbous tailpiece;
   a multi-stranded skirt including strands having first and second ends, the strands being free from attachment to each other at both ends; and
   a holding member engaging the skirt between the first and second ends and the narrow stem portion of the stem piece in the space, wherein the strands are deflected by the wider end of the headpiece in a direction away from the headpiece.

2. The fishing lure dressing according to claim 1, wherein an exterior wall of the tapered headpiece is generally conical in shape.

3. The fishing lure dressing according to claim 1, wherein the holding member engages the strands a distance from the ends of the strands.

4. The fishing lure dressing according to claim 1, wherein the bulbous tailpiece is disposed at least a distance away from the headpiece, so that the strands are urged outwardly away from the stem piece to provide broad spreading of the strands.

5. A fishing lure dressing according to claim 1 wherein said headpiece includes a plurality of multibristle weed guards radiating therefrom and away from said stem piece.

6. A fishing lure according to claim 1 including a plurality of rattles attached to said headpiece.

7. A fishing lure dressing, comprising;
   a continuously tapered headpiece, the headpiece having a first narrow end, a second wider end, a cavity at the wider end, and a stem piece being attached to and extending from the first narrow end inside the cavity and extending out of the wider end of the headpiece, the stem piece including a narrow stem portion substantially disposed within the cavity and a bulbous tailpiece disposed outside the cavity, the narrow stem portion having an outer diameter substantially smaller than an inner diameter of the cavity so that an annular space is defined between an interior wall of the cavity and the narrow stem portion, the stem piece having a bore extending through the bulbous tailpiece and the narrow stem portion, the bore exiting the first narrow end of the headpiece, the bore retaining a shaft of a hook such that an eye of the hook extends exteriorly from the first narrow end of the headpiece and at least one barb of the hook extends exteriorly from the bulbous tailpiece;
   a multi-stranded skirt including strands having first and second ends, the strands being free from attachment to each other at both ends; and
   a holding member engaging the strands between the first and second ends thereof and the narrow stem portion of the stem piece within the annular space, wherein the strands are deflected by the wider end of the headpiece in a direction away from the headpiece and generally toward the at least one barb of the hook.

8. A fishing lure dressing according to claim 7 wherein said headpiece has a peripheral edge at its wider end and wherein said peripheral edge includes a jagged peripheral edge, whereby said deflected strands may be deflected to varying degrees depending upon where on said jagged peripheral edge they engage.

9. A fishing lure dressing according to claim 7 wherein said headpiece has a peripheral edge at its wider end and wherein said peripheral edge includes a filamentary periphery of fibers extending away therefrom, whereby said deflected strands engage with said fibers.

10. A fishing lure dressig according to claim 7 wherein said stem piece is detachable and re-engageable with said headpiece while constantly maintaining said skirt on said stem piece.

11. The fishing lure dressing according to claim 7, wherein the headpiece includes a plurality of multibristle weed guards radiating therefrom and away from the stem piece.

12. The fishing lure dressing according to claim 7, wherein a trailing peripheral edge of the headpiece includes a plurality of filamentary members.

13. The fishing lure dressing according to claim 12, wherein at least one of said filamentary members includes an end cap having a recessed cavity and wherein a housing including a plurality of rattle beads is mounted to the recessed cavity of the end cap.

14. The fishing lure dressing according to claim 7, wherein a plurality of tabs project from the headpiece, wherein each tab includes a bore, and wherein a housing including a plurality of rattle beads is mounted to the bore of each tab.

15. The fishing lure dressing according to claim 7, wherein the strands include a plurality of seriatim protrusions that project from flat intermediate strand surfaces.

\* \* \* \* \*